(12) United States Patent
Gulsun et al.

(10) Patent No.: US 10,762,637 B2
(45) Date of Patent: Sep. 1, 2020

(54) VASCULAR SEGMENTATION USING FULLY CONVOLUTIONAL AND RECURRENT NEURAL NETWORKS

(71) Applicant: Siemens Healthcare GmbH, Erlangen (DE)

(72) Inventors: Mehmet Akif Gulsun, Lawrenceville, NJ (US); Yefeng Zheng, Princeton Junction, NJ (US); Puneet Sharma, Monmouth Junction, NJ (US); Vivek Kumar Singh, Princeton, NJ (US); Tiziano Passerini, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 120 days.

(21) Appl. No.: 15/795,629

(22) Filed: Oct. 27, 2017

(65) Prior Publication Data

US 2019/0130578 A1     May 2, 2019

(51) Int. Cl.
*G06T 7/174*     (2017.01)
*G06T 7/00*     (2017.01)
*G06N 3/04*     (2006.01)
*G06T 7/11*     (2017.01)

(52) U.S. Cl.
CPC .............. *G06T 7/174* (2017.01); *G06N 3/04* (2013.01); *G06T 7/0012* (2013.01); *G06T 7/11* (2017.01); *G06T 2207/10072* (2013.01); *G06T 2207/20084* (2013.01); *G06T 2207/30048* (2013.01); *G06T 2207/30101* (2013.01)

(58) Field of Classification Search
CPC ......... G06T 7/0012; G06T 7/11; G06T 7/174; G06T 2207/10072; G06T 2207/20084; G06T 2207/30048; G06T 2207/30101; G06N 3/04; G06N 3/0445; G06N 3/0454; G06N 3/084
See application file for complete search history.

(56) References Cited

U.S. PATENT DOCUMENTS

| | | |
|---|---|---|
| 7,627,156 B2 | 12/2009 | Margolis et al. |
| 7,940,974 B2 | 5/2011 | Skinner et al. |
| 7,953,266 B2 | 5/2011 | Gulsun et al. |
| 8,526,699 B2 | 9/2013 | Mittal et al. |
| 8,538,105 B2 | 9/2013 | Masumoto |
| 9,129,417 B2 | 9/2015 | Zheng et al. |
| 9,767,557 B1 | 9/2017 | Gulsun et al. |
| 2010/0004526 A1 | 1/2010 | Wei et al. |
| 2010/0076296 A1 | 3/2010 | Mittal et al. |
| 2012/0274133 A1 | 11/2012 | Takehara et al. |
| 2013/0329038 A1 | 12/2013 | Hager et al. |

(Continued)

OTHER PUBLICATIONS

Gülsün, Mehmet A., et al. "Coronary centerline extraction via optimal flow paths and CNN path pruning." International Conference on Medical Image Computing and Computer-Assisted Intervention. Springer, Cham, Oct. 2, 2016. (Year: 2016).*

(Continued)

*Primary Examiner* — Katrina R Fujita

(57) ABSTRACT

Systems and methods are provided for automatic segmentation of a vessel. A sequence of image slices containing a vessel is acquired. Features maps are generated for each of the image slices using a trained fully convolutional neural network. A trained bi-directional recurrent neural network generates a segmented image based on the feature maps.

14 Claims, 8 Drawing Sheets

(56) References Cited

U.S. PATENT DOCUMENTS

| | | | | |
|---|---|---|---|---|
| 2014/0254900 | A1* | 9/2014 | Sturm | A61B 5/0037 |
| | | | | 382/128 |
| 2014/0355854 | A1* | 12/2014 | Kelm | G06T 7/149 |
| | | | | 382/131 |
| 2016/0310018 | A1* | 10/2016 | Fonte | A61B 6/504 |
| 2017/0011288 | A1* | 1/2017 | Brothers | G06F 9/30036 |
| 2017/0032208 | A1 | 2/2017 | Hager et al. | |
| 2017/0255832 | A1* | 9/2017 | Jones | G06N 3/0454 |
| 2017/0286972 | A1* | 10/2017 | Hausler | G06Q 30/016 |
| 2017/0352347 | A1* | 12/2017 | Sharma | G10L 15/16 |
| 2018/0121799 | A1* | 5/2018 | Hashimoto | G06F 40/216 |
| 2018/0182101 | A1* | 6/2018 | Petersen | G06K 9/6277 |
| 2018/0275967 | A1* | 9/2018 | Mohamed | G06N 3/08 |
| 2018/0336184 | A1* | 11/2018 | Bellegarda | G06F 40/30 |
| 2018/0349359 | A1* | 12/2018 | McCann | G06F 40/30 |
| 2019/0042850 | A1* | 2/2019 | Jones | G06K 9/00711 |
| 2019/0197366 | A1* | 6/2019 | Kecskemethy | G06K 9/6269 |

OTHER PUBLICATIONS

Chen, Jianxu, et al. "Combining fully convolutional and recurrent neural networks for 3d biomedical image segmentation." Advances in neural information processing systems. Sep. 2016. (Year: 2016).*

Lugauer, Felix, et al. "Improving accuracy in coronary lumen segmentation via explicit calcium exclusion, learning-based ray detection and surface optimization." Medical Imaging: Image Processing. 2014.

Poudel, Rudra PK, Pablo Lamata, and Giovanni Montana. "Recurrent fully convolutional neural networks for multi-slice mri cardiac segmentation." International Workshop on Reconstruction and Analysis of Moving Body Organs. Springer, Cham, 2016.

* cited by examiner

VASCULAR SEGMENTATION USING FULLY CONVOLUTIONAL AND RECURRENT NEURAL NETWORKS

BACKGROUND

The present embodiments relate to processing medical diagnostic images.

Accurate and timely segmentation and modeling of vessels or lumens is a challenging task in many applications. For example, intensity contrast may change drastically along vessels; vessels may touch each other near bright structures such as bone or other vessels; a single vessel tree can have large and small vessels due to scale change; and local vessel structure may deviate from a tubular shape due to the presence of pathological conditions such as stenosis.

For vessels or lumens, existing models use centerlines of branches or boundaries detected by an automated algorithm or manually annotated by a medical imaging operator. The models may be learning based or hand-crafted models built with only local image features.

Segmenting the boundary of a vessel or lumen with high precision is a challenging task as even the main coronary arteries have diameters of only a few millimeters. In addition, the contrast of the vessel or lumen, that may be visually enhanced by contrast dye, is in between the contrast of non-calcified and calcified plaque that complicates an accurate distinction. The segmentation of a lumen obtained by existing segmentation algorithms may be misled by calcifications leading to over-estimation or under-estimation of the boundaries. In addition, the correct visualization of the coronary anatomy is made difficult by the anatomical complexity of the coronary tree that may result in projections that are difficult to read and identify. Since the diagnostic value of non-invasive procedures relies on accurate modeling of the vessel or lumen, a precise segmentation is desired.

SUMMARY

By way of introduction, the preferred embodiments described below include methods and systems for automatic segmentation of a vessel. A sequence of image slices containing a vessel is acquired. Features maps are generated for each of the image slices using a trained fully convolutional neural network. A trained bi-directional recurrent neural network generates a segmented image based on the feature maps.

In a first aspect, a method is provided for segmenting a plurality of images. An image processor acquires the plurality of images. The plurality of images comprises sequential image slices of a vessel. A feature map is generated for each of the plurality of images using a machine-trained fully convolutional network. Segmented images are generated for each of the plurality of images based on the features maps for the plurality of images using a machine-trained recurrent neural network.

In a second aspect, a method is provided for segmenting a three-dimensional image. The three-dimensional image is acquired. A line through the three-dimensional image is identified. A plurality of image slices is acquired at sampling points along the line. Feature maps are generated by a machine-trained fully convolutional network for each of the plurality of images slices. Segmented images are generated by a machine-trained recurrent neural network for each of the plurality of images slices based on the feature map. A model is generated from the segmented images.

In a third aspect, an imaging system is provided for segmenting images for medical applications. The system includes a medical image scanner and an image processor. The medical image scanner is configured to acquire a series of two dimensional cross-sectional images. The image processor is configured as a machine-trained fully convolutional network, the machine-trained fully convolutional network configured to generate a feature map for each of the plurality of two dimensional cross-sectional images. The image processor is further configured as a machine-trained recurrent neural network, the machine-trained recurrent neural network configured to generate segmented images for each of the two-dimensional cross-sectional images based on the feature maps.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

Sequentially received information from images slices taken along a branch of a vessel are exploited using a recurrent neural network (RNN) coupled with a fully convolutional network (FCN) for achieving sequential segmentation. Medical imaging scanners provide for acquisition of high quality images that are proven as a viable alternative to invasive angiography for ruling out vascular diseases such as coronary stenosis and plaque as well as for predicting future cardiac events. Automated segmentation of a vessel or lumen for stenosis quantification and fractional flow reserve (FFR) measurements and automated detection and segmentation of coronary plaques for plaque quantification may be possible. Images are segmented by using a combination of fully convolutional and recurrent neural networks. The trained FCN provides a feature map for image slices acquired along a centerline of a vessel. The trained RNN configured to look both forward and backwards between slices is used to segment the images using the feature maps. The segmented image may be used to generate a model of the vessel or identify various features for medical diagnosis.

Prior solutions for segmentation have been used to identify the boundaries of a vessel. For example, vessel axis extraction and border estimation, simple neural networks, watershed-based, region growing, and level set-based approaches have been used. Each of these methods may require some manual initialization and some even user intervention. Moreover, the methods are error prone when dealing with artifacts in the image data, irregular shapes, or noisy images. These methods further may only provide accurate segmentation for healthy vessels. In certain vessels, calcified, non-calcified and mixed plaques may confuse the methods. The combination of FCN and RNN may avoid or mitigate some or all of the errors of the previous solutions.

Figure 1:
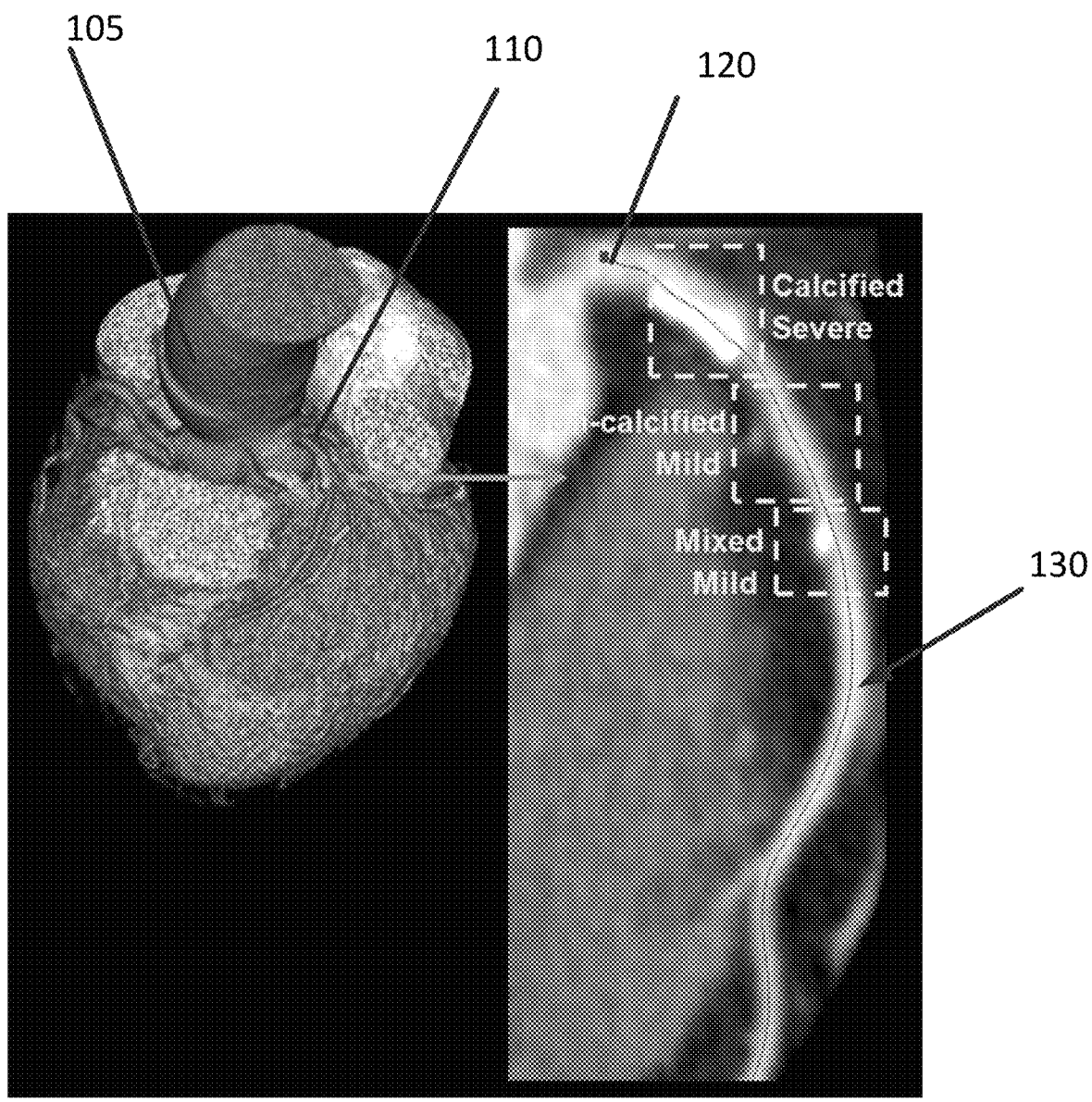
FIG. 1 depicts a three-dimensional model and an example vascular disease along a coronary artery containing calcified, non-calcified and mixed plaques with different stenosis grading.

FIG. 1 depicts a three-dimensional model and an example vascular disease along a coronary artery containing calcified, non-calcified and mixed plaques with different stenosis grading. One application for segmentation is to segment healthy vessel lumen as well as plaques to form the three-dimensional model. FIG. 1 includes a three-dimensional model 105 of a heart. Included in the model is one or more vessels 110. The three-dimensional model 105 is generated from a series of captured images, such as the two-dimensional image on the right. During an imaging procedure, a patient is placed in the scanning apparatus. A scanning device is operated to scan the body of a patient. Two dimensional images may be captured at different locations or slices through a structure. The two-dimensional image in FIG. 1 includes a vessel 130, a centerline of the vessel 120, and three regions that depicts calcified severe plague, non-calcified mild plaque, and mixed mild plague. The centerline 120 may be added manually by an operator or automatically through the use of a known algorithm. As depicted, the boundary of the vessel 130 is difficult to identify. In addition to the image being fuzzy, the plague may interfere with a boundary determination.

Figure 2:
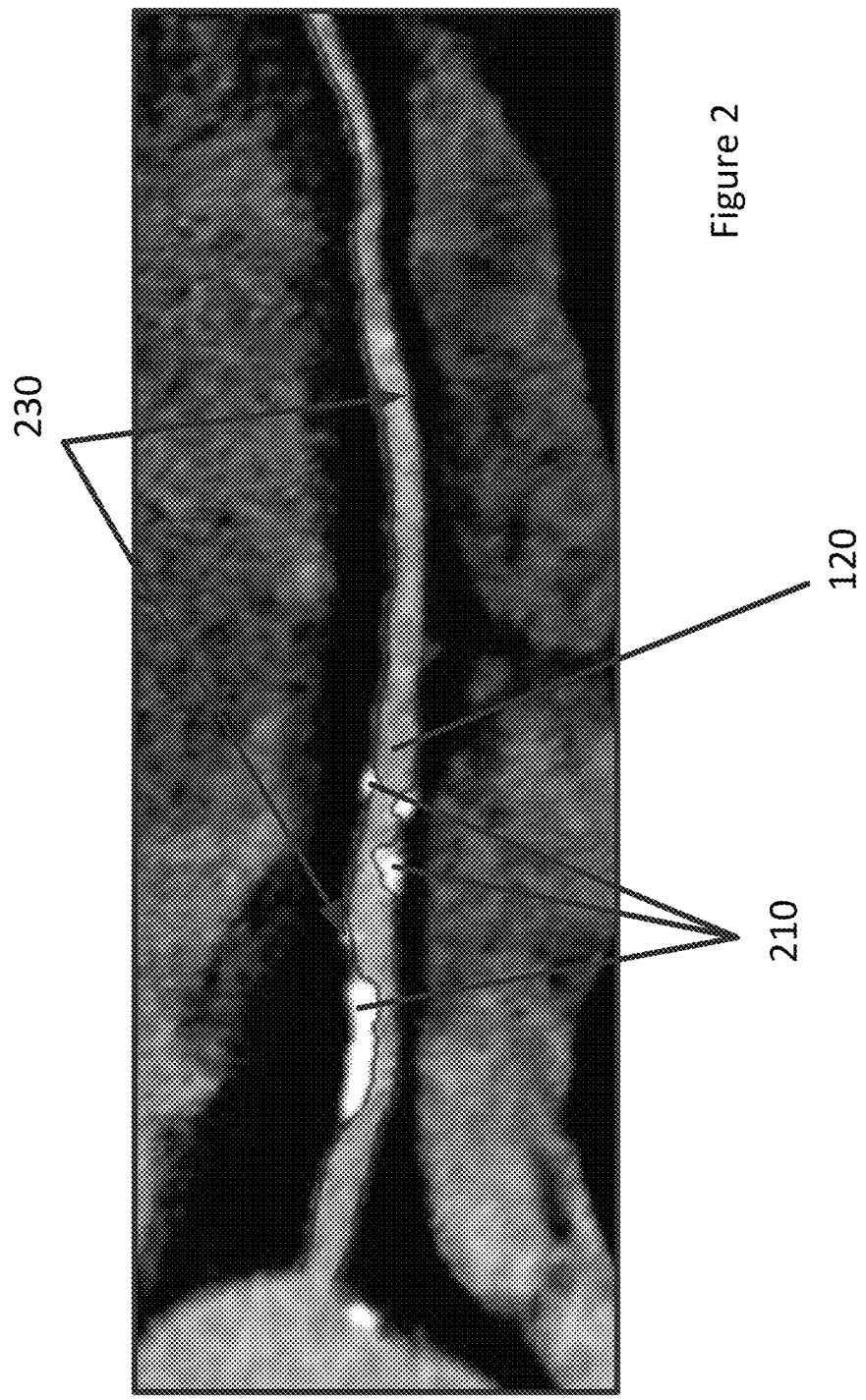
FIG. 2 depicts a two-dimensional example of coronary lumen segmentation.

FIG. 2 depicts a two-dimensional example of coronary lumen segmentation. FIG. 2 includes a vessel 120, several regions that include plague 210, and a boundary 230 of the vessel. The vessel 120 in FIG. 2 has been segmented so that the boundary 230 may be identified. If the boundary 230 is accurate, a plurality of images such as the two-dimensional image in FIG. 2 may be combined to generate the three-dimensional model 105 of FIG. 1. The three-dimensional model 105 may then accurately display both healthy and unhealthy vessels of a patient's vascular system.

Figure 3:
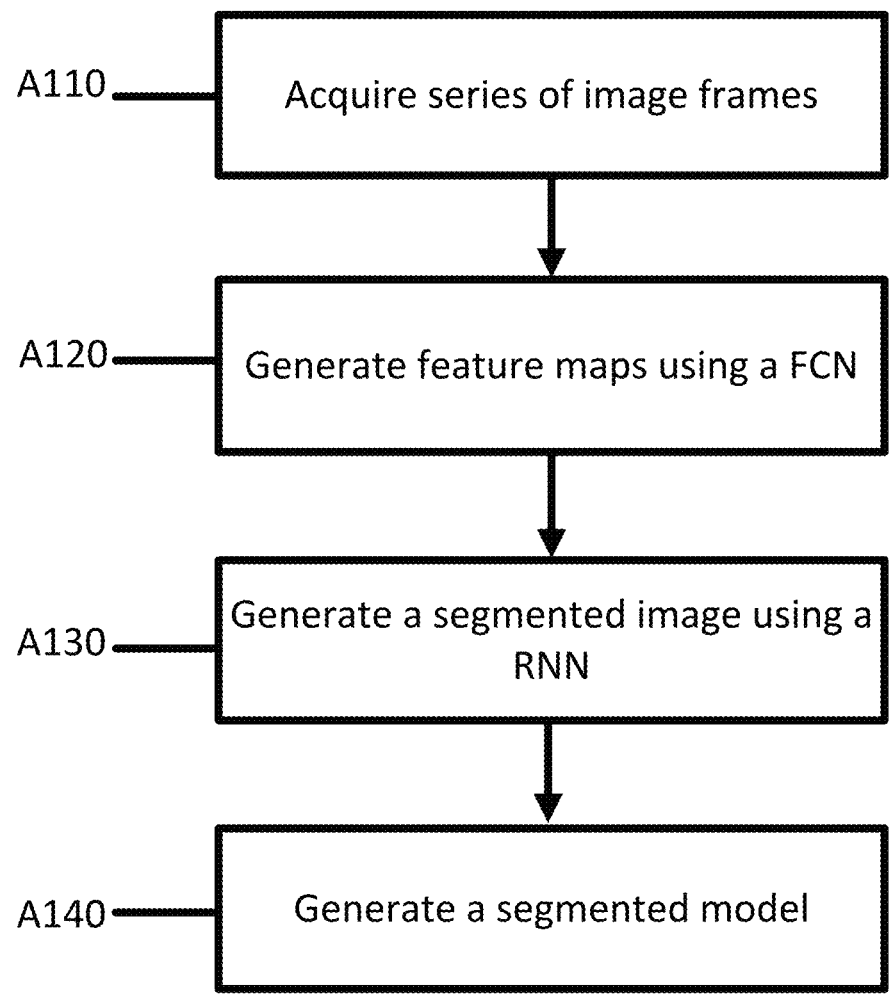
FIG. 3 depicts one embodiment of a method for providing vascular segmentation using fully convolutional and recurrent neural networks.

FIG. 3 depicts one embodiment of a method for providing vascular segmentation using fully convolutional and recurrent neural networks. The acts are performed by the system of FIG. 8, other systems, an image processor, a medical scanner, a workstation, a computer, and/or a server. For example, A110 may be performed by a medical imaging device. Acts A120 and A130 are performed by a processing component, such as an image processor, medical scanner, a workstation, or a computer. Additional, different, or fewer acts may be provided. Act A140 may be skipped in certain embodiments. For example, the output of Act A130 may be provided directly to an operator or stored for later use. The acts are performed in the order shown (e.g., top to bottom) or other orders.

In act A110, a series of image frames are acquired. The image frames may be acquired using any imaging technique. For example, different types of medical imaging systems and corresponding medical scanners may be used to acquire the image frames. In an embodiment, an x-ray scanner may be used to generate two-dimensional images. In one embodiment, the image frames are computed tomography (CT) images acquired with a CT system. For CT, the raw data acquired with the detector is reconstructed into a three-dimensional representation. In another embodiment, magnetic resonance (MR) data representing a patient is acquired. MR data is acquired with an MR system. The data is acquired using a pulse sequence and coils for measuring magnetic response. For MR, the magnetic resonance data is k-space data. Fourier analysis is performed to reconstruct the data from the k-space into a three-dimensional object or image space.

The image frame is a collection of data that may be used for imaging, such as scan data. Image or image data may be data in a display format or data in a scan format that may be processed to create a displayed image.

In an embodiment, the image frames are two-dimensional vessel cross-sectional images along a centerline of a branch of a vessel of a patient. The two-dimensional cross-sectional images may be acquired directly from a scanner. Alternatively, the image frames may be extracted from a three-dimensional image. Each of the two-dimensional cross-section images is acquired or extracted at a respective sampling point along a vessel centerline of a vessel of interest. The vessel centerline may be identified using known techniques, such as using a centerline tracing method or a machine learning based centerline detection method. Other automatic or semi-automatic techniques for extracting vessel centerlines may be used as well. The vessel centerline may be manually annotated by an operator using a user input device, such as a mouse.

The vessel centerline may be sampled at regular intervals to establish a plurality of sample points along the vessel centerline. A uniformly sampled distribution may be used to define evenly spaced sampling points or, alternatively, a varied distribution may be used. For example, depending on the vessel of interest, different distributions may be used. For different portions of a vessel, different distributions may be used. For example, additional sampling points may be used in a portion of a vessel that is expected to contain obstructions. Sections that narrow or expand quicker than other sections may include additional sampling points. A respective two-dimensional cross-section image is extracted from the three-dimensional image at each sampling point on the vessel centerline. Each two-dimensional cross-section image may be a predetermined size image centered at the respective sampling point and aligned orthogonally with a tangent direction to the vessel centerline at that sampling point. Alternatively, the two-dimensional cross-section image may not be centered at the respective sampling point, may have different sizes, and/or may not be orthogonal to the tangent. For example, for certain vessels, the two-dimensional cross-section image may be sized to include other features such as other vessels, instruments, or obstructions.

Figure 4:
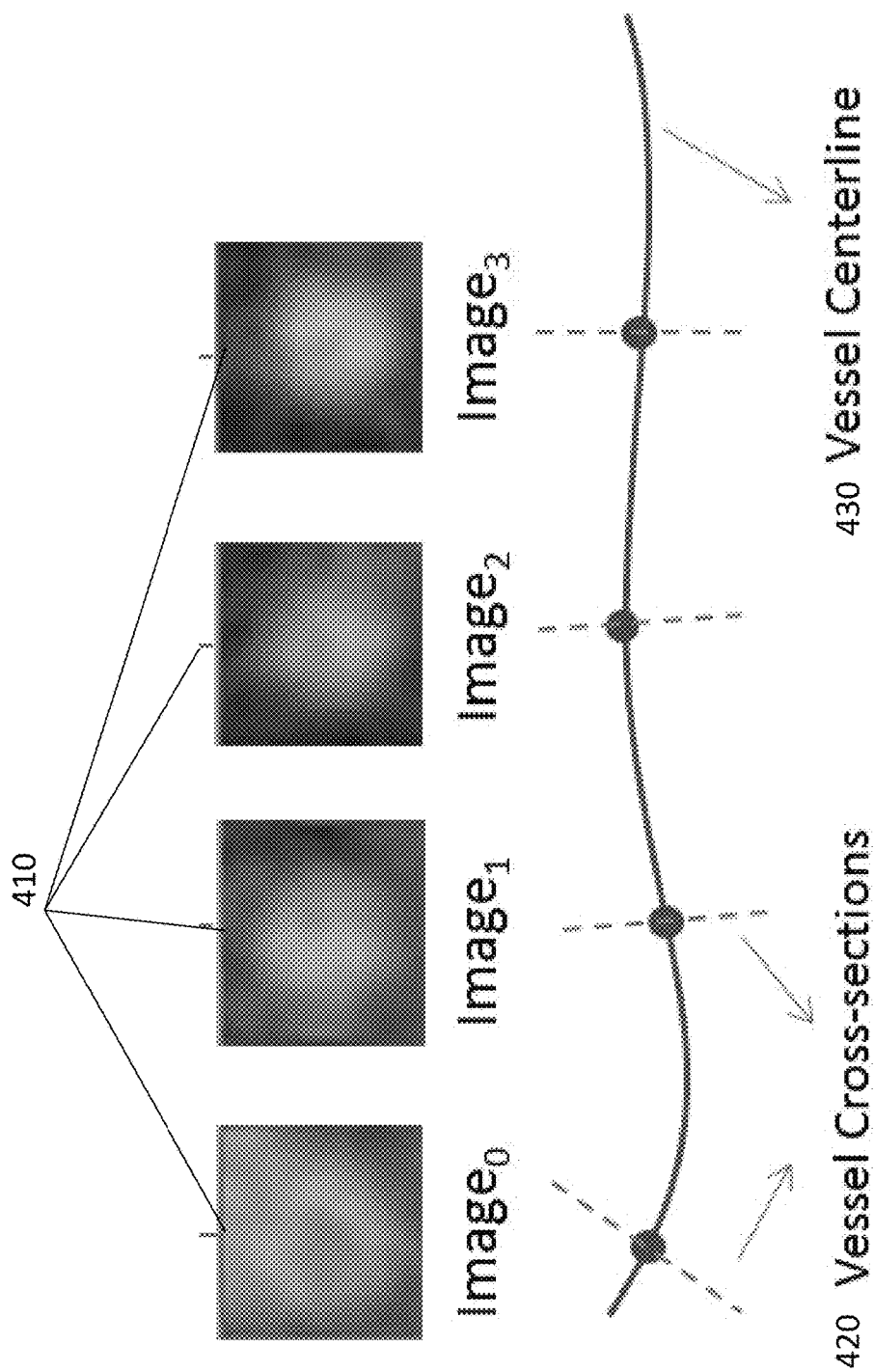
FIG. 4 depicts an example of cross-sectional images along the centerline of a coronary artery.

FIG. 4 depicts examples of cross-sectional images along the centerline of a coronary artery. FIG. 4 depicts a vessel centerline 430, four vessel cross-section sampling points 420, and four images 410 for the sample points 420. The four images 410 may be acquired at a right angle (i.e., orthogonally) to the vessel centerline 430 as depicted. Alternatively, the images may be acquired parallel to one another. Different vessels may use different image plane configurations. For example, a vessel that doubles back or includes sharp turns may include images that are acquired at a right angle of the vessel centerline 430 in order for the images to capture sequential images of the vessel.

In an embodiment, multiple series of image frames may be acquired over different periods of time. Each image frame may include a temporal component along with the locational component. The image frames taken over time may be combined to generate a temporal series or video of the inside of the blood vessels and/or organs of a patient.

In certain embodiments, a contrast agent may be used. A contrast agent may help differentiate tissues from one another or fluid from tissue. In certain embodiments, no contract agents are used. The image frames may include data that represents a guide wire, a stent, or other artificial device.

The acquired image frames may be stored for later analysis in a memory or database, for example, using a Digital Imaging and Communication (DICOM) standard. In an embodiment, the acquired image frames may be transmitted remotely for analysis. In other embodiments, the image frames are received from or by the medical imager.

At act A120 of FIG. 3, the image frames are input to an FCN. A convolutional neural network (CNN) is a type of neural network that is trained on prior acquired data in order to identify information about an image. In an FCN, the neural network includes convolutional layers without any fully-connected layers that are typically inserted at the end of a CNN. A fully connected layer implies that every node in a previous layer is connected to every node in the next layer. With fully connected layers, traditional convolutional networks may not be able to manage different input sizes and may be slower. By excluding the fully connected layers, fully convolutional networks include only convolutional layers, which leads to flexibility in input sizes and efficiencies in both processing resources and time.

The layers in an FCN extract features from an input image frame. A typical convolutional network is composed of multiple stages or layers. The output of each stage is made of a set of two-dimensional arrays called feature maps. Each feature map is the outcome of one convolutional (or pooling) filter applied over the full image. At each layer or stage, a feature map is generated from the previously input image frame or feature map. The output of a layer or stage is another feature map. For an FCN, convolution layers preserve the spatial relationship between pixels in the input image by learning image features using small squares of input data from the input image or feature map. An FCN may include one or more N convolutional layers and one or more M pooling layers. A convolutional layer is a layer of filters that compute a value for a section of the image. Additional convolutional layers may boost the accuracy of the neural network, but also take more time. Adjusting the size of the filters in the layers may further increase the accuracy. Large filters for initial layers and small filters for subsequent or at the end may increase performance. A pooling layer progressively reduces the spatial size of the representation to reduce the number of parameters and computation in the network and to also control overfitting. The outputted feature map from the FCN (i.e., from the final or last convolutional or pooling layer) represents high-level features of the input image. The FCN may include any variation of convolution layers and pooling layers. In an embodiment, the FCN is a U-net FCN. For a U-net FCN, the network includes a down sampling section, a flat section, and an up-sampling section. For the up-sampling section, pooling layers may be replaced by up sampling operators that increase the resolution features from the down sampling or contracting path. Up sampling provides an outputted feature map that is the same size as the input image.

The FCN is a machine-trained network. The FCN is trained from many samples with known or ground truth annotation. For segmentation, the FCN is trained from samples with expert created segmentation. The FCN learns feature maps that best distinguish the vessel represented in cross-section image frames from other tissue or objects. Using the previously acquired annotated image data, the FCN is taught to identify features that are distinctive for classification. For training, the FCN inputs a training image, performs a forward propagation step, and identifies the output probabilities. For a first training or optimization pass, weights may be randomly assigned and as such, output probabilities are also random. A total error is calculated at the output layer as a function of the target probability and output probability. Backpropagation may be used to then calculate gradient of the error with respect to weights in the network and update filter values or weights and parameter values to minimize the output error. The weights may be adjusted in proportion to the weights contribution to the total error. When the same image is input again, output probabilities may be closer to the target vector. Parameters like number of filters, filter sizes, architecture of the network etc. are fixed before Step 1 and do not change during training process—only the values of the filter matrix and connection weights get updated. Alternatively, one or more aspects of the FCN architecture (i.e., the parameters) may adapt during training.

Training data for teaching the FCN may be acquired from prior acquired image data. The training data may be annotated (e.g. marked up or identified) manually by an operator. Alternative algorithms may be used to annotate the training data. For example, a slow yet accurate algorithm may be used to annotate the training data as there may not be any time constraints. The training data may be updated at regular intervals as additional image data is acquired. The network may be trained regularly or with different sets of training data until the network achieves an acceptable level of error. Different training data may be used for different vessels or lumens.

As depicted in FIG. 4, the series of image frames include a plurality of two-dimensional cross-sectional images along the centerline of the vessel. Each image is input into the trained FCN. The image frames may be processed in parallel or in series. The output of the FCN is a feature map that includes one or more values for one or more features for each of the pixels in each image frame.

Alternative FCNs may be used. A different number of layers may be provided depending on the type of images, resources available, and timing constraints. For example, for real time generation during a procedure, fewer layers may be used to save processing time.

In an embodiment, the FCN may use additional data as input. The output feature may be different based on different values of inputs from the cross-sectional image and the additional data. For example, the FCN may use additional features such as geometric features of the centerline (e.g. local Frenet frame, curvature, torsion, length from the ostium to the current point, among other). The additional features may correlate with a spatial distribution of a contrast agent within the anatomical structure of interest (e.g. blood vessel). The additional features may provide additional information relating to how flow is determined by the geometry. The additional information may improve the segmentation accuracy by implicitly accounting for physiological changes in the geometry of the vascular tree (e.g. tapering along the length of healthy vascular segments). The additional information may also improve segmentation accuracy for cross-sections in which the contrast agent is not homogeneously distributed due to the non-axial symmetry of the fluid velocity profile (e.g. in bends, after eccentric stenoses, etc.).

A dense convolutional network (e.g., DenseNet) may be used. The dense convolutional network is an FCN that connects each layer to every other layer in a feed-forward fashion. For each layer, the feature-maps of all preceding layers are used as inputs, and the output feature-map of that layer are used as inputs into all subsequent layers. Alternatively, the FCN is not a dense convolutional network, such as where each layer receives only the output feature map from a previous layer and only outputs to the next layer in sequence. Other interconnections between the layers may be provided.

At act A130 of FIG. 3, each outputted feature map (feature map image) of the sequence of sampling points is input to a trained RNN. For a sample point, the FCN outputs a feature map. Each respective image for each sampling point along the vessel centerline is segmented by the RNN. The segmentation of each sampling point by the RNN depends not only on the cross-section image extracted at that sampling point, but also on the cross-section images extracted at the other sampling points as well. The RNN may be bi-directional, e.g. able to look at both forwards and backwards images in the sequence. RNNs are used for prediction tasks from sequential information with multiple time points. Here, instead of or in addition to using multiple time points, the feature maps of the cross-section images extracted from various spatial locations (i.e., respective centerline sampling points) in the CTA image are input to an RNN. The RNN processes the spatial sequence of feature maps as if the feature maps were a dynamic time-sequence of images. By processing the feature maps together, the RNN uses both forward and backwards images in the sequence to segment the images.

Figure 5:
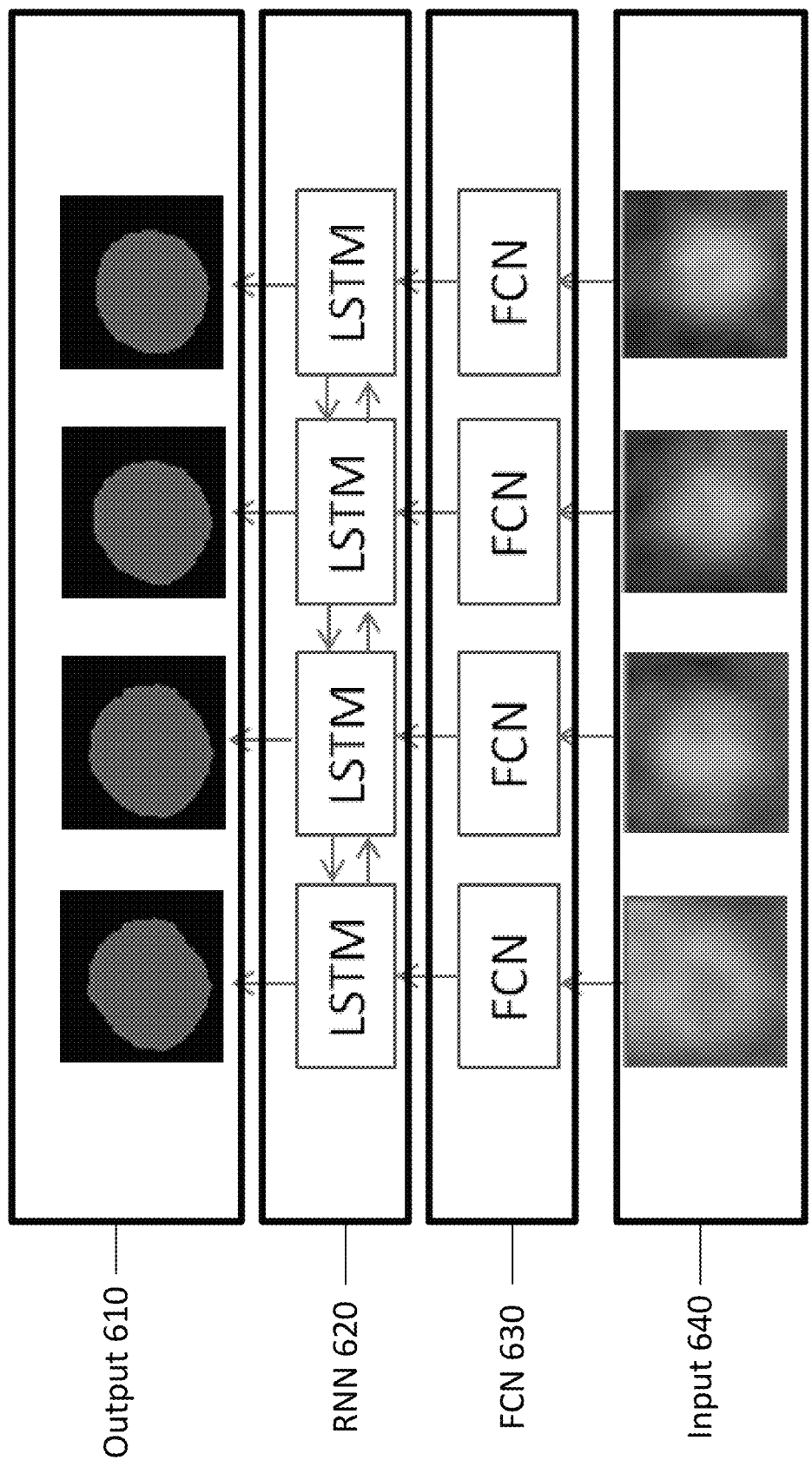
FIG. 5 depicts an example architecture using a bi-directional recurrent neural network and a fully convolutional neural network for vessel segmentation.

FIG. 5 depicts an example architecture using a bi-directional RNN and an FCN for vessel segmentation. As shown in FIG. 5, the two-dimensional cross-section images are input 640 to the FCN 630. The FCN 630 processes the two-dimensional cross-sectional images in parallel. Each output of the FCN 630 is input to the RNN 620 as corresponding to a fictional time point. The FCN 630 may provide images of a fixed size. Accordingly, the two-dimensional cross-section images input to the FCN 630 may be predetermined size image patches extracted from larger two-dimensional cross-section images. The FCN 630 encodes each input image 640 into a feature map that is a high-level semantic representation of the input image 640, and the feature map extracted for each two-dimensional cross-section image by the FCN 630 is input to the RNN 620. The same trained FCN 630 (with the same learned weights) is applied to each of the two-dimensional cross-section images.

The RNN 620 inputs the feature map extracted by the FCN 630 for each of the two-dimensional cross-section images and outputs a segmented image 610 for each of the corresponding sampling points of the vessel centerline. The result may include a pixel by pixel identification of the boundary of one or more objects in the two-dimensional cross-sectional image. As depicted in FIG. 5, the output 610 may be a binary image that differentiates the vessel and the surrounding tissue. Additional information may be included with the image such as, for example, labels for different types of tissues, obstructions, calcifications, foreign objects, or other features in the images. The result may include a multi-class label, e.g., for plaque type classification (e.g., calcified, non-calcified, mixed), or a continuous value, e.g., for stenosis grading regression. Alternatively, the output segmentation defines a vessel boundary rather than a binary vessel region within the boundary.

As depicted in FIG. 5, the RNN 620 is implemented as a bi-directional LSTM. For the RNN 620, the output of a time point is dependent only on previous time points. A bi-directional RNN 620 is trained where both the original (forward direction) and reversed (backward direction) inputs are fed into the RNN 620. Different types of RNN architectures, such as long short-term memory (LSTM) or gated recurrent unit (GRU), may be used. The RNN is trained from training data to segment. The training data includes the feature maps from the trained FCN and the segmentations from the training data of the FCN. Alternatively, different ground truth sample segmentations are used from training the RNN than used for training the FCN. The RNN is optimized separately from the FCN. Alternatively, the RNN and FCN are optimized jointly.

Figure 6:
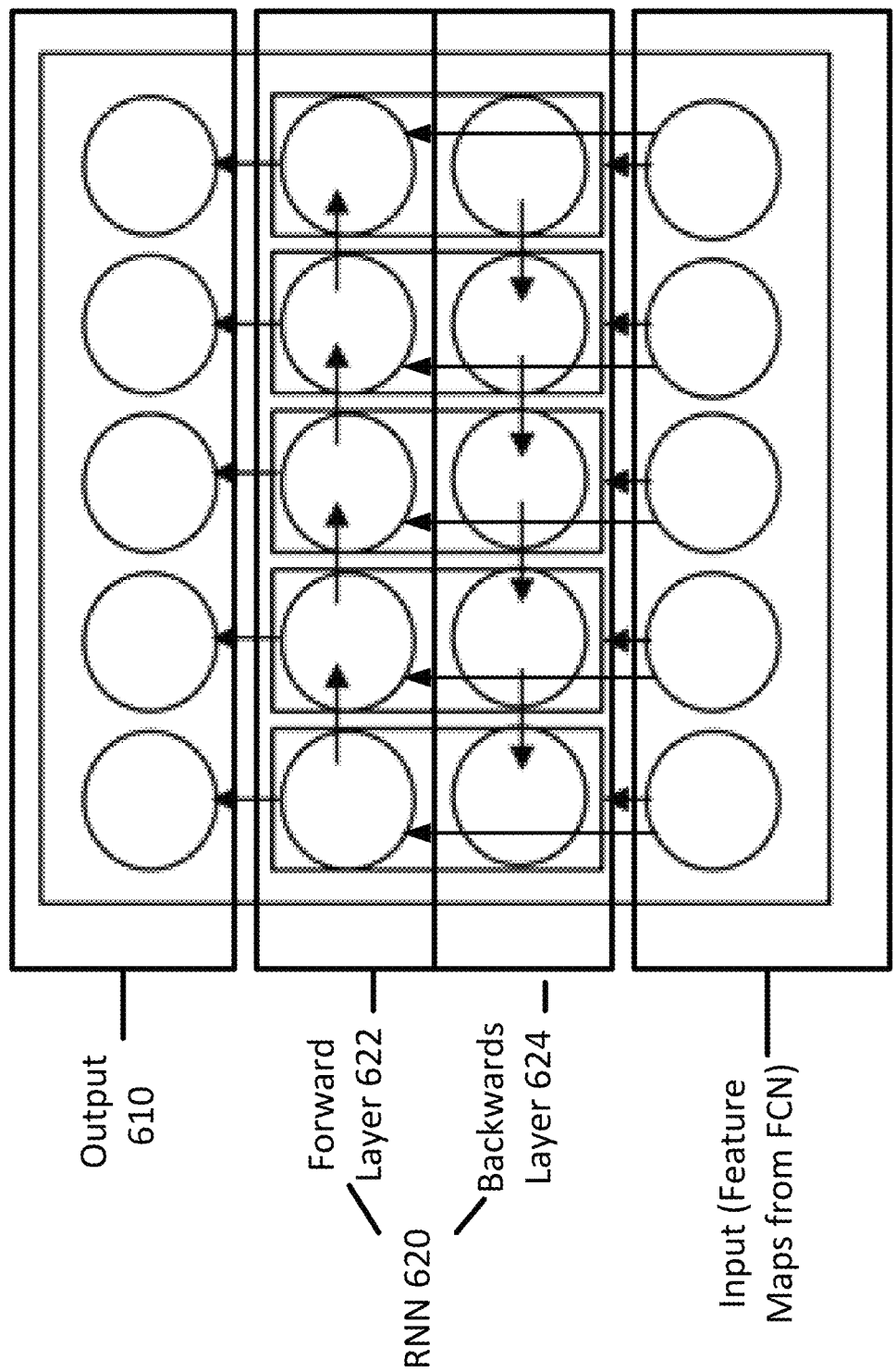
FIG. 6 depicts example bi-directional long short-term memory layers of the recurrent neural network architecture of FIG. 5.

FIG. 6 depicts one embodiment the bi-directional LSTM layers of the RNN 620 architecture of FIG. 5. As depicted in FIG. 6, the bi-directional LSTM layer includes a forward direction LSTM layer 622 and a backward direction LSTM layer 624. The forward LSTM layer 622 and the backward LSTM layer 624 are first and second trained LSTMs with different learned weights. The features extracted by the FCN 630 for each two-dimensional cross-section image are input to both the forward LSTM layer 622 and the backward LSTM layer 624. The forward LSTM layer 622 starts by segmenting a first image in the sequence based on the corresponding two-dimensional cross-section image, and then sequentially segments each subsequent image in a forward direction (e.g., from ostium to distal end) along the vessel centerline based on the corresponding two-dimensional cross-section image and image information from the cross-section images corresponding to the previously segmented sampling points. The backward LSTM layer 624 starts by segmenting a final image in the sequence based on the corresponding two-dimensional cross-section image, and then sequentially segments each preceding image in a backward direction (e.g., from distal end to ostium) along the centerline based on the corresponding two-dimensional cross-section image and image information from the cross-section images corresponding to the previously segmented images. That is, the forward LSTM layer 622 starts at one end of the vessel centerline and works forward and the backward LSTM layer 624 starts at the other end of the vessel centerline and works backward.

The forward LSTM output and the backward LSTM output for each image are combined (e.g., by concatenating, summing, or averaging (weighted or unweighted) the forward and backward outputs) to determine the final segmented output. For example, if the forward and backward LSTMs directly output a segmented image, the results of two LSTMs are summed or averaged. One or more additional neural network layers may be inserted between the LSTM output and the final output. The outputs of two LSTMs may be concatenated into a longer feature vector as input to the additional neural network layers.

The RNN 620 outputs a two-dimensional segmented image 610. The two-dimensional segmented image may include labels for one or more pixels. For example, for a binary classification of the pixels, the two-dimensional segmented image may include a vessel tissue label or non-vessel tissue label. The RNN architecture may also output labels for other tissues or plaque types. For example, each pixel may be identified as one of normal, calcified plaque, non-calcified plaque, or mixed plaque. Additional features such as probes, stents, wires, or foreign objects may also be identified and classified. The RNN architecture may output a numerical value for each pixel.

At act A140 of FIG. 3, a segmented model of the vessel is generated. A model or view of the segmented vessel may be provided to the user through a display. The segmented images may be combined to create a three-dimensional model. Different colors or shades may be used to visually identify features such as the boundaries of the vessel. The three-dimensional model may be used to render an image. The boundaries may be overlaid on the rendered three-dimensional image or a rendering from the image frame. The boundaries are added to the image as an overlay. The segmented vessel may be provided in real time to a user during a procedure.

In an embodiment, the segmented vessels may be used to detect one or more vascular abnormalities. The segmented vessels and/or model may be used to classify a type of the one or more vascular abnormalities in the vessel. For example, the segmented vessels may identify one or more regions in the vessel that include a level of plaque or other obstruction. The extent of the plague may be quantified using the segmented vessel and the quantification may be provided to an operator.

While the above method is described with reference to a vessel, the acts A110-A140 may be used to perform a slice by slice segmentation of any three-dimensional structure in volumetric images, such CT and MR. Any type of structure that may be sliced into image slices that are sequentially related may be used. In addition, the method may leverage the information from multiple frames to segment a static image in a particular frame over time. In this example, the input image frames may include multiple series of image slices over time. Each slice may be related to neighboring sequential slices for a time period and related slices in neighboring temporal series. The output two-dimensional segmented image may be used in, for example, left ventricle segmentation in two-dimensional short axis cine MRIs or coronary segmentation in two-dimensional angiograms.

Furthermore, the method may be applied to other image analytics tasks such as tracking devices or landmarks (FCN applied for frame-by-frame localization and RNN for data association across frames) and tracking image segments in two dimensional plus time and three dimensional plus time data. Embodiments may be applied to other two-dimensional or three-dimensional medical images to perform other medical image segmentation tasks as well.

Figure 7:
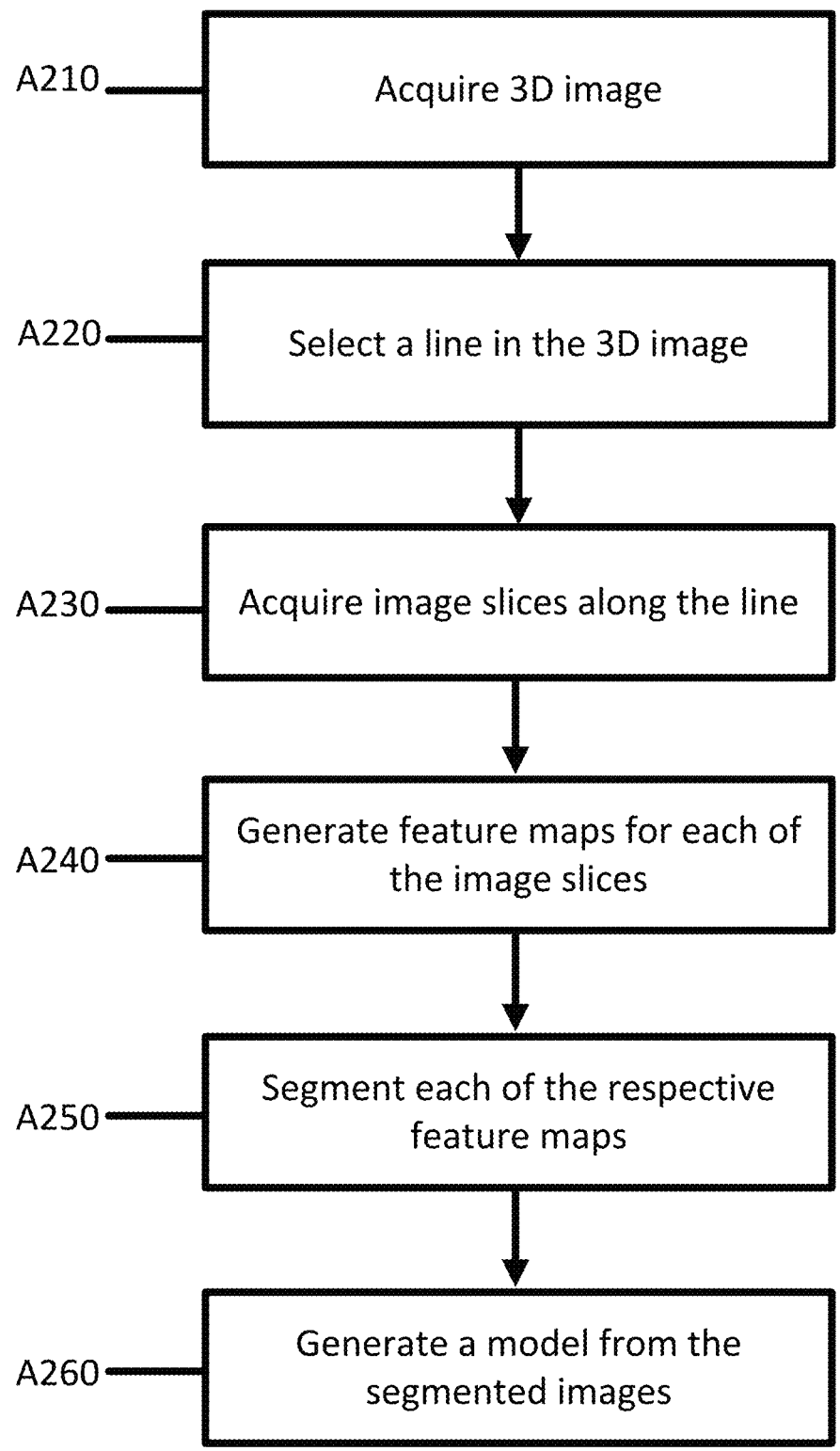
FIG. 7 depicts an embodiment of a method for segmenting a three-dimensional image.

FIG. 7 depicts an embodiment of a method for segmenting a three-dimensional image. The method of FIG. 7 may apply to any three-dimensional image or object with some sequential relationship. The acts are performed by the system of FIG. 8, other systems, a medical scanner, a workstation, a computer, and/or a server. For example, acts A240 and A250 are performed by a processing component, such as a workstation or a computer. Acts A210-A230 may be performed by an imaging device. The acts are performed in the order shown (e.g., top to bottom) or other orders. Additional, different, or fewer acts may be used, such as not performing A210 and A220 if the images slices have been previously or directly acquired from the imaging device.

At act A210, a three-dimensional image is acquired. The three-dimensional image may be acquired using an X-ray scan, CT scan, MR scan, ultrasound, or through another imaging technique. The three-dimensional image may include a view of the interior of a patient or object. The images may be two dimensional or combined to form a three-dimensional image.

At act A220, a line is selected in the three-dimensional image. The line passes through at least one structure in the three-dimensional image. The structure may be, for example, a lumen, a vessel, an organ, other object of interest. The line may be automatically selected using an algorithm. The line may be manually drawn through the structure.

At act A230, image slices are selected along the line at a plurality of sampling points. The sampling points may be evenly distributed along the line. Alternatively, the plurality of sampling points may be selected based on the type of structure that is to be segmented. For example, types of vessels may include different distributions of sampling points than an organ or lumen. The image slices may be cropped to only include the structure of interest. The image slice may be all of the same size or different sizes.

At act A240, feature maps for each of the image slices are generated. The feature maps are generated by an FCN. The FCN includes a plurality of layers of nodes. Layers may be convolutional layers, ReLU layers, or Pooling layers. Convolution layers compute the output of nodes that are connected to local regions in the input, each computing a dot product between their weights and a small region they are connected to in the input volume. ReLU layers apply an elementwise activation function, such as the max(0,x) thresholding at zero. Pooling layer perform a down sampling operation along the spatial dimensions (width, height), resulting in reduced volume. The FCN may be U-shaped, e.g. including a down convolution section, a flat convolution section, and an up-convolution section. The FCN outputs a feature map for each of the image slices. The FCN may be trained by collecting a plurality of images with similar features and inputting the images into the FCN. Weights for the layers may be adjusted until the final feature map is similar to an expected or annotated label for each the plurality of images. The output of the FCN is a feature map for the particular image slice. Each of the slices may be input into the same or identically weighted FCNs to produce a feature map. Each of the slices may be processed in parallel.

At act A250, segmented images are generated for each of the feature maps of the slices. A bi-directional RNN is used to generate the segmented images. The RNN includes a feedback loop by using a memory cell such as LSTM. LSTM addresses the long-term memory issue of a conventional RNN by introducing three gates, which control the input, output, and memory state. The RNN may be trained based on ground truth training samples with back-propagation, similar to a conventional feed-forward neural network. For forward pass, forward states and backward states are passed first, then output neurons are passed. For backward pass, output nodes are passed first, then forward states and backward states are passed next. After forward and backward passes are done, the weights are updated. The ground truth training samples may include previously annotated or identified structures from similar images. In an example, the ground truth training samples may be annotated manually by an operator.

At act A260, the segmented images are combined to generate a model of the structure. The segmented images may provide a boundary for the structure. The segmented images may be stitched or connected to provide a wire frame model (e.g., mesh) of the structure. The wire frame model may be provided directly to an operator or may be provided with the original three-dimensional image. Additional information may be provided with the model. For example, in an embodiment, the FCN and RNN may identify additional features in the images. The additional features may be provided in the model.

Figure 8:
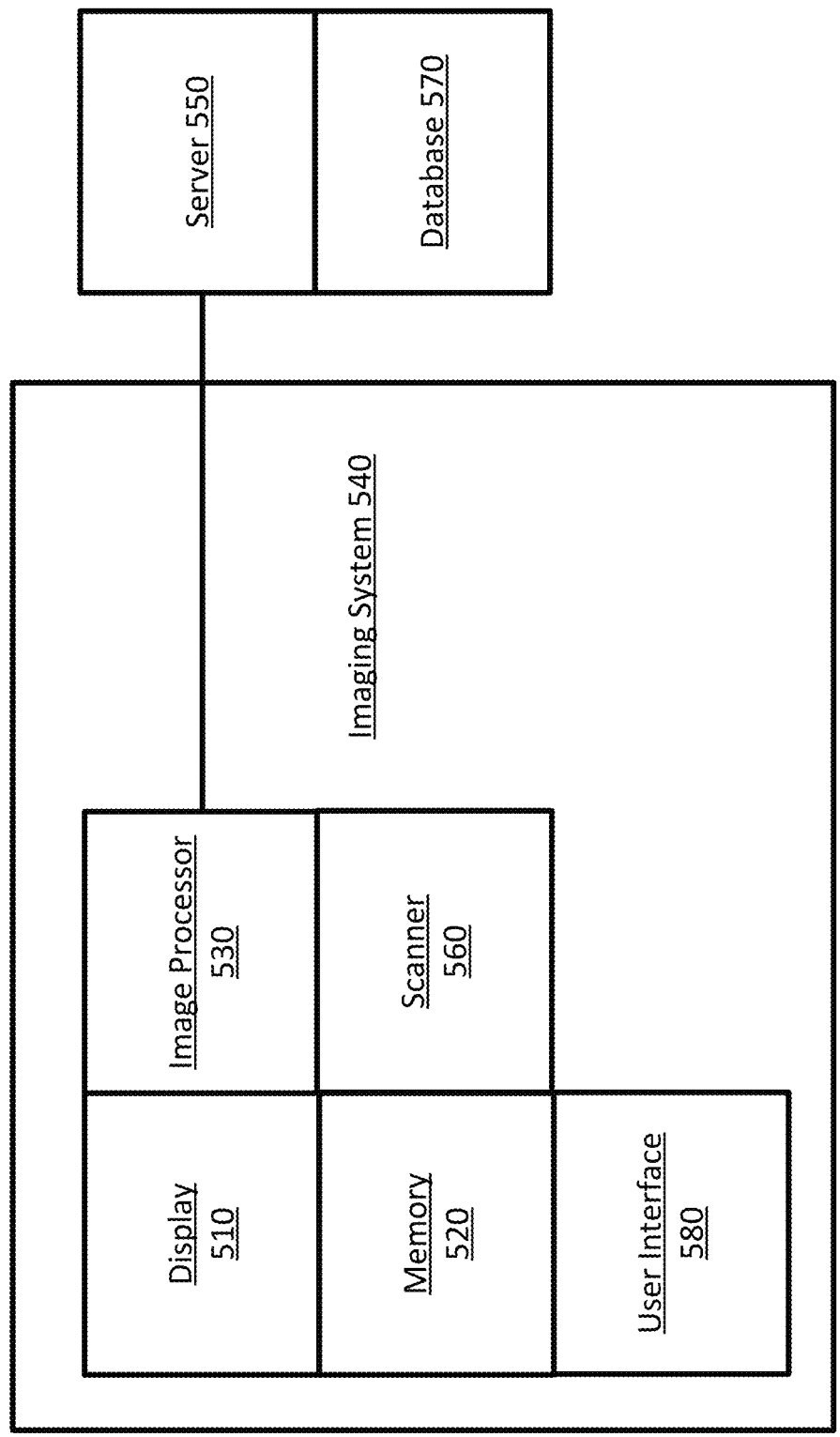
FIG. 8 depicts an embodiment of a system for image segmentation using fully convolutional and recurrent neural networks.

FIG. 8 depicts an embodiment of a system for vascular segmentation using fully convolutional and recurrent neural networks. The system includes an imaging system 540, a server 550, and a database 570. The imaging system includes an image processor 530, a memory 520, a display 550, and a scanner 560. Additional, different, or fewer components may be provided. For example, network connections or interfaces may be provided, such as for networking with a medical imaging network or data archival system. In another example, the user interface 580 is provided as part of the display 510 or imaging system 540.

The image processor 530, memory 510, display 510, user interface 580, and scanner 560 are part of the imaging system 540. Alternatively, the image processor 530 and memory 520 are part of an archival and/or image processing system, such as associated with a medical records database workstation or server, separate from the imaging system 540. In other embodiments, the image processor 530 and memory 520 are a personal computer, such as desktop or laptop, a workstation, a server, a network, or combinations thereof. The image processor 530, display 510, and memory 520 may be provided without other components for acquiring data by scanning a patient.

The imaging system 540, image processor 530, memory 520, display 550, user interface 580, and scanner 560 are provided at a same location. The location may be a same room, same building, or same facility. These devices are local relative to each other and are remote to the server 550. The server 550 is spaced apart by a network by being in a different facility or by being in a different city, county, state, or country. The server 550 and database 570 may be remote from the location of the imaging system 540.

The imaging system 540 is a medical diagnostic imaging system. Computed tomography (CT), X-ray, ultrasound, and/or magnetic resonance (MR) systems may be used. The scanner 560 may include a transmitter and includes a detector for scanning or receiving data representative of the interior of the patient. The imaging system 540 is configured to acquire a series of cross sectional images. The imaging system 540 may acquire a three-dimensional image and derive the cross-sectional images from the three-dimensional image. The imaging system 540 may acquire a plurality of series of cross sectional images over time that may be used to generate a video. The cross-sectional images may be cross sectional images at a plurality of sampling points along a centerline of a structure of interest, for example, a centerline of a coronary vessel. The centerline may be identified manually or automatically using various known algorithms.

In one embodiment, the imaging system 540 is a CT or X-ray system. An X-ray source is connected with a gantry. A detector is also connected with a gantry opposite the X-ray source. The patient is positioned between the source and detector. The source and detector are on opposite sides of the patient and rotate and/or translate about the patient. The detected X-ray energy passing through the patient is converted, reconstructed, or transformed into data representing different spatial locations within the patient. In an embodiment, the imaging system 540 may include a portable or mobile C-arm. The C-arm includes an X-ray source and an image intensifier or flat-panel detector. The C-shaped connecting element allows movement horizontally, vertically and around the swivel axes, so that X-ray images of the patient may be produced from almost any angle. The generator emits X-rays that penetrate the patient's body. The image intensifier or detector converts the X-rays into a visible image displayed on a monitor or stored for later use.

In another embodiment, the imaging system 540 is an MR system. The MR system includes a main field magnet, such as a cryo-magnet, and gradient coils. A whole-body coil is provided for transmitting and/or receiving. Local coils may be used, such as for receiving electromagnetic energy emitted by atoms in response to pulses. Other processing components may be provided, such as for planning and generating transmit pulses for the coils based on the sequence and for receiving and processing the received k-space data. The received k-space data is converted into object or image space data with Fourier processing.

The memory 520 may be a graphics processing memory, a video random access memory, a random-access memory, system memory, cache memory, hard drive, optical media, magnetic media, flash drive, buffer, database, combinations thereof, or other now known or later developed memory device for storing data or video information. The memory 520 is part of the imaging system 540, part of a computer associated with the processor 530, part of a database, part of another system, a picture archival memory, or a standalone device.

The memory 520 stores medical imaging data, graphical or display setting, and/or images. The memory 520 may store data during processing for application and/or may store training data (e.g., images and attributes).

The memory 520 or other memory is alternatively or additionally a non-transitory computer readable storage medium storing data representing instructions executable by the programmed image processor 530 for segmenting vascular structures. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code, and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The image processor 530 is a general processor, central processing unit, control processor, graphics processing unit, digital signal processor, three-dimensional rendering processor, image processor, application specific integrated circuit, field programmable gate array, digital circuit, analog circuit, combinations thereof, or other now known or later developed device for segmentation of an image frame using a learnt FCN and RNN. The processor 530 is a single device or multiple devices operating in serial, parallel, or separately. The processor 530 may be a main processor of a computer, such as a laptop or desktop computer, or may be a processor for handling some tasks in a larger system, such as in the imaging system 530. The image processor 530 is configured by instructions, design, hardware, and/or software to perform the acts discussed herein.

The image processor 530 and/or server 550 are configured to perform the acts discussed above for segmenting a plurality of images. The image processor 530 and/or server 550 are configured to acquire image slices, generate features maps for the image slices, and generate segmented images. The image processor 530 and/or server 550 may be configured by or to use an FCN and an RNN for processing of image slices. The image processor 530 and/or server 550 are configured to identify a centerline of a vessel in a three-dimensional image. Sequential image slices are acquired for a plurality of sampling points along the centerline. Each of the image slices is input into the FCN to generate a feature map. The feature map is input into the RNN to generate a segmented image. The segmented images may be combined to identify the boundaries of the vessel.

The image processor 530 and/or server 550 may be configured to identify additional features in the segmented images. For example, the image processor 530 and/or server 550 may be configured to identify plague regions from the segmented images. The extension of the plague may be quantified or identified and provided to an operator.

The FCN and RNN may be trained based on prior imaging data and attributes (ground truth) stored in the database 570 or memory 520. The image processor 530 and memory 520 may store individual frames, series of frames, and attributes of the image frames for the imaging system 540. The server 550 and/or database 570 may store image frames, series of images frames, and attributes of the image frames from one or more imaging systems 540.

The image processor 530 and/or server 550 are configured to provide segmented images to the display 510 or to the memory 520. The display 510 is a monitor, LCD, projector, plasma display, CRT, printer, or other now known or later developed devise for outputting visual information. The display 510 receives images, graphics, text, quantities, or other information from the image processor 530, memory 520, imaging system 540, and/or server 550. The display 510 is configured to provide images and labels to a user.

The user interface 580 may be configured to receive one or more selections from a user. The user interface 580 may include an input device such as one or more buttons, a keypad, a keyboard, a mouse, a stylus pen, a trackball, a rocker switch, a touch pad, a voice recognition circuit, or other device or component for inputting data. The user interface 580 and the display 510 may be combined as a touch screen that may be capacitive or resistive.

The server 550 connects to the imaging system 540 via a network. The network is a local area, wide area, enterprise, another network, or combinations thereof. In one embodiment, the network is, at least in part, the Internet. Using TCP/IP communications, the network provides for communication between the image processor 530 and the server 550. Any format for communications may be used. In other embodiments, dedicated or direct communication is used.

The server 550 is a processor or group of processors. More than one server 550 may be provided. The server 550 is configured by hardware and/or software. In one embodiment, the server 550 performs machine learning with the FCN and RNN with training data in the database 570. The server 550 may acquire and the database 570 may store data from multiple scanning machines.

The database 570 is a memory, such as a bank of memories, for storing training data, such as images and respective parameters. Weights or values of images or attributes of the neural networks are stored in the database 570 and/or the memory 520.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for segmenting a plurality of images, the method comprising:
    acquiring, by an image processor, the plurality of images, wherein the plurality of images comprise sequential image slices of a vessel along a centerline of the vessel, wherein each sequential image slice is centered at a respective sampling point and aligned orthogonally with a tangent direction to the centerline at the respective sampling point;
    generating, by the image processor, a feature map for each of the plurality of images using a machine-trained fully convolutional network; and
    generating, by the image processor, segmented images for each of the plurality of images based on the feature maps for the plurality of images using a bi-directional long short-term memory network comprising at least a forward direction long short-term memory layer and a backward direction long short-term memory layer that each input a respective feature map, wherein the outputs of the forward direction long short-term memory layer and the backward direction long short-term memory layer are averaged to generate a segmented image, wherein each of the segmented images includes labels for different types of tissues, obstructions, calcifications, and foreign objects.

2. The method of claim 1, further comprising:
    generating, by the image processor, a segmented model of the vessel using the segmented images.

3. The method of claim 2, further comprising:
    detecting, by the image processor, one or more vascular abnormalities in the vessel based on the segmented model; and
    classifying, by the image processor, a type of the one or more vascular abnormalities in the vessel.

4. The method of claim 1, further comprising:
    acquiring, by the image processor, one or more geometric features of the centerline;
    wherein the machine-trained fully convolutional network uses the one or more geometric features as inputs.

5. The method of claim 4, wherein the one or more geometric features comprise a curvature of the vessel.

6. The method of claim 1, wherein the respective sampling points are uniformly distributed along the centerline.

7. A method for segmenting a three-dimensional image, the method comprising:
    acquiring, by an image processor, the three-dimensional image;
    identifying a centerline of a vessel through the three-dimensional image;
    acquiring, by the image processor, a plurality of image slices at sampling points along the centerline, wherein each image slice is centered at a respective sampling point and aligned orthogonally with a tangent direction to the centerline at the respective sampling point;

generating, by the image processor, with a machine-trained fully convolutional network, feature maps for each of the plurality of images slices;

generating, by the image processor, segmented images for each of the plurality of images slices based on the feature maps with a bi-directional long short-term memory network comprising at least a forward direction long short-term memory layer and a backward direction long short-term memory layer that each input a respective feature map, wherein the outputs of the forward direction long short-term memory layer and the backward direction long short-term memory layer are averaged to generate the segmented images, each of the segmented images including labels for different types of tissues, obstructions, calcifications, and foreign objects; and generating, by the image processor, a model from the segmented images.

8. The method of claim 7, wherein the machine-trained fully convolutional network includes a down sampling region and an up-sampling region.

9. An imaging system for segmenting images for medical applications, the imaging system comprising:

a medical image scanner configured to acquire a sequential series of two-dimensional cross-sectional images along a centerline of a vessel, wherein each two-dimensional cross-sectional image is centered at a respective sampling point and aligned orthogonally with a tangent direction to the centerline at the respective sampling point; and an image processor configured as a machine-trained fully convolutional network, the machine-trained fully convolutional network configured to generate a feature map for each of the plurality of two dimensional cross-sectional images, the image processor further configured as a bi-directional long short-term memory network comprising at least a forward direction long short-term memory layer and a backward direction long short-term memory layer that each input a respective feature map, wherein the outputs of the forward direction long short-term memory layer and the backward direction long short-term memory layer are averaged to generate segmented images for each of the two-dimensional cross-sectional images based on the feature maps, each of the segmented images including labels for different types of tissues, obstructions, calcifications, and foreign objects.

10. The imaging system of claim 9, further comprising:
a display configured to display the segmented images.

11. The imaging system of claim 9, wherein the medical image scanner is configured to acquire the series of two-dimensional cross-sectional images at uniform points along the centerline of the vessel.

12. The imaging system of claim 11, wherein the image processor is further configured to generate a model of the vessel from the segmented images.

13. The imaging system of claim 11, wherein the machine-trained recurrent neural network is further configured to identify one or more types of plaque based on the features maps.

14. The imaging system of claim 9, wherein the medical image scanner is configured to acquire a plurality of series of two-dimensional cross-sectional image over a period of time.

* * * * *